Figure 1:
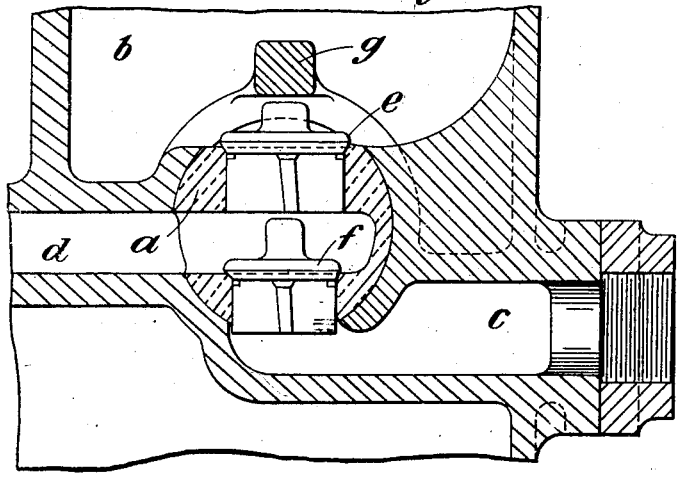
Figure 2:
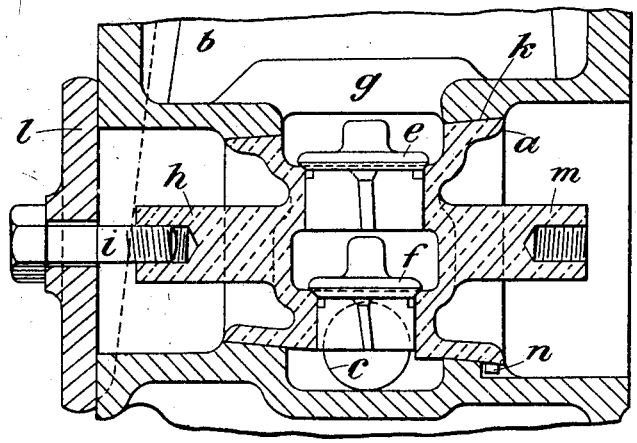

F. W. BRACKETT
VALVE OF PUMPS.
APPLICATION FILED NOV. 26, 1919.

1,378,760.

Patented May 17, 1921.

Witnesses

Inventor.
Francis W. Brackett
by
Attorney

UNITED STATES PATENT OFFICE.

FRANCIS WHITWELL BRACKETT, OF COLCHESTER, ENGLAND.

VALVE OF PUMPS.

1,378,760.  Specification of Letters Patent.  Patented May 17, 1921.

Application filed November 26, 1919. Serial No. 340,840.

*To all whom it may concern:*

Be it known that I, FRANCIS WHITWELL BRACKETT, a subject of the King of Great Britain, residing in Colchester, England, have invented certain new and useful Improvements Relating to the Valves of Pumps, of which the following is a specification.

That part of a pump which carries the valves has been constructed in the form of a taper plug in which are the valve seatings, the plug itself being carried in a suitable cavity. By this invention the construction is improved by arranging the axis of the valves at an angle to that of the plug, instead of in the axis of the plug. The purpose achieved is that both ends of the plug are readily accessible, the surface of the plug which must be fluid tight in the cavity is comparatively small and the plug is easily held in place.

Such a construction is shown in the accompanying drawings representing two sections in planes at right angles to each other through the valve casing.

*a* is the conical plug, *b* is the delivery chamber of the pump, *c* the suction pipe, *d* the connection with the plunger chamber, *e* the delivery valve, *f* the suction valve, and *g* a stop for the delivery valve.

The plug may have an extension *h* having in its end face a screw-threaded bore to receive a screw *i*, so that when a plug has been inserted in the conical socket *k* provided for it in the pump casting, it may be drawn home by turning the screw *i*, the head of which bears against a cover plate *l*. The plug may be located axially by suitable means, such as the ring pin *n*.

Where it is required to withdraw the plug for cleaning or repairing the valves, the screw *i* is removed and to provide for difficulty in directly withdrawing the plug owing to its having become bound in the socket, the plug may have a second extension *m* opposite the first and also provided with a screw threaded bore, so that the cover plate *l* and screw *i* may be applied to this end of the plug for withdrawing the latter.

Having thus described the nature of the said invention and the best means I know of carrying the same into practical effect, I claim:—

1. In a pump, a valve casing having an internally ported and open ended conical seating socket and passages communicating with the seating and with, respectively, the pump inlet pipe and the pump plunger chamber, the axis of the said seating being at an angle to the axis of the plunger chamber connecting passages, a hollow conical plug housed in said socket and provided with seatings, alined and independently guided suction and delivery valves mounted on said seatings, the axes of the valves being at an angle to the axis of the plug, and means for mechanically adjusting the plug in position lengthwise of its seating to take up wear.

2. In a pump, a valve casing having an internally ported and open ended conical seating socket and passages communicating with the seating and with, respectively, the pump inlet pipe and the pump plunger chamber, the axis of the said seating being at an angle to the axis of the plunger chamber connecting passages, a hollow conical plug housed in said socket and provided with seatings, alined suction and delivery valves mounted on said seatings, the axes of the valves being at an angle to that of the plug, and means for drawing said plug home in said seating socket comprising an extension formed on the smaller end of the plug and having in its end a screw threaded bore, a cover plate seated against one of the open ends of the casing and a screw engaging in the threaded bore and having a head bearing against the cover plate.

3. In a pump, a valve casing formed with an internal ported and open ended conical seating socket and with passages communicating with the seating and with, respectively, the pump inlet pipe and the pump plunger chamber, the axis of the said seating being at an angle to the axis of the plunger chamber connecting passages, a hollow conical plug housed in said socket and having valve seatings, alined and independently guided suction and delivery valves mounted on said seatings, the axes of the valves being at an angle to the axis of the plug, and means for pulling the plug in a direction toward the smaller end of its seating and means for pulling the plug in the reverse direction.

In testimony whereof I have signed my name to this specification.

FRANCIS WHITWELL BRACKETT.